Patented June 19, 1945

2,378,572

UNITED STATES PATENT OFFICE 2,378,572

PROCESS FOR THE PRODUCTION OF A HIGHLY DISPERSE PIGMENT

Wilhelm Müller and Leonhard Spies, Bitterfeld, Germany; vested in the Alien Property Custodian No Drawing. Application May 11, 1939, Serial No. 273,046. In Germany May 16, 1938

6 Claims. (Cl. 23—56)

This invention relates to a process for the production of a highly disperse pigment.

According to a known proposal a difficultly albeit positively soluble, highly disperse pigment having passivating properties is obtained by subjecting readily water-soluble, complex potassium-iron chromate to a heat treatment in an autoclave at a temperature of about 200° C. in the presence of about twice the amount by weight of water. When used as a coating medium, this complex chromate exhibits the property of causing a certain amount of $CrO_4$ ions to dissolve on contact with water, which ions then effect a pronounced and comparatively persistent passivation and thereby increase the corrosion resistance of the surface of the coated metal. This proposal is, however, somewhat cumbersome since the water-soluble potassium-iron chromate must first be made and then subjected to the autoclave treatment at elevated temperature, which treatment is difficult to control.

The present invention aims at providing a simplified process for the production of complex potassium-iron chromates having similar properties, by electrolysis of an acidified aqueous solution of a potassium salt without supplying heat.

To this end, according to the invention, an electrolyte which consists of a potassium salt, e. g. a potassium chromate or potassium chloride solution of any desired concentration, and the pH value of which is kept constantly between 2 and 6 is subjected to electrolysis using an anode of a ferrochrome alloy having an initial chromium content of at least about 50%, and a cathode of any desired metal. To keep the pH value of the electrolyte within the range hereinbefore set forth, a caustic potash solution is preferably added to the electrolyte during the process with constant stirring, thereby neutralising the acid formed during the electrolysis.

During the electrolysis sludge is formed at the anode and is deposited at the bottom of the vessel. The sludge which consists of potassium-iron chromate of the approximate composition:

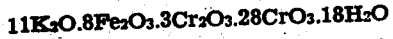

$$11K_2O.8Fe_2O_3.3Cr_2O_3.28CrO_3.18H_2O$$

is removed from the cell from time to time and is thereupon washed out with water. The washing water may be used, if desired, for making up the electrolyte solution, the volume of which has been reduced either by partial evaporation or by being entrained with the anode sludge.

The dried, ochre-brown potassium-iron chromate is found to be a pigment of excellent quality. About 80% by weight of the unground product is of a grain size of under $5\mu$. The high dispersiveness of the potassium-iron chromate produced by the hereindescribed process imparts a high covering power to the paints made therewith.

A further advantage arising in the use of potassium-iron chromate, produced in accordance with the invention, as a coating medium for metals which are exposed to corroding agents, has been found to be that it forms a passive layer largely preventing the corrosion of the surface of the metal in consequence of its property of causing small amounts of chromate ions to dissolve in the presence of water.

The potassium-iron chromate pigment of the present invention may also be mixed, on account of its good passivating properties, with other colour pigments which do not possess these properties.

The potassium-iron chromate pigment of the present invention may be produced in the following manner.

The potassium-iron chromate pigment of the present invention may be produced in the following manner:

An iron sheet is immersed as cathode, and a plate of a ferrochrome alloy containing 66.4% of chromium is immersed as anode in an aqueous electrolyte which contains 200 grams of KCl per litre and the pH value of which has been adjusted to 3.5 by the addition of hydrochloric acid. During electrolysis which is conducted with a voltage of 4 volts and an anodic current density of 0.1 amp. per square centimetre, a certain quantity of caustic potash lye is added to the electrolyte from time to time in order to maintain the pH value thereof at or about its original level. Electrolysis results in the formation of an anodic sludge consisting of the desired potassium iron chromate, which is removed from the electrolytic container at intervals of about 4 days each. The removed product is washed several times with hot water while being stirred and thereupon dried at 105° C. A pulverulent ochre-brown product consisting of potassium iron chromate is thus obtained, 80% of the grains of which are of a size of less than $5\mu$.

If desired, the potassium-iron chromate pigment produced in accordance with the invention can also be subjected to a subsequent pressure treatment at about 200° C. by the known method hereinbefore referred to. In this case, the composition of the pigment is changed in the sense that the proportion of $K_2O$ in the compound is lowered while the proportions of $Fe_2O_3$ and $Cr_2O_3$ are raised. The proportion of $CrO_3$ is also increased, as can easily be calculated on the basis of the ratio of $CrO_3:K_2O$. Thus the composition of the potassium-iron chromate produced electrolytically is $$11K_2O\ 8Fe_2O_3\ 3Cr_2O_3\ 28CrO_3\ 18H_2O$$

If this product is treated in a closed vessel for two hours at 200° C. with addition of twice the amount by weight of water, the solid matter obtained after separation from the mother liquor has the approximate composition:

$$3K_2O\ 7Fe_2O_3\ 5Cr_2O_3\ 13CrO_3\ 28H_2O$$

The two pigments display no substantial differences with respect to grain size. The potassium-iron chromate after-treated in the autoclave however, when in contact with water, possesses the property of emitting $CrO_4$ ions into solution to a smaller degree than the product directly obtained by electrolysis.

We claim:

1. A process for the production of a highly disperse potassium iron chromate pigment, which comprises subjecting an aqueous solution of a salt of the class consisting of potassium chloride and potassium chromate, to electrolysis with an anode initially consisting essentially of iron chromium with at least about 50% of chromium, while permanently maintaining a pH value of the electrolyte of between about 2 and about 6.

2. A process for the production of a highly disperse potassium iron chromate pigment, which comprises subjecting an aqueous potassium chromate solution to electrolysis with an anode initially consisting essentially of iron chromium with at least about 50% of chromium, while permanently maintaining a pH value of the electrolyte of between about 2 and about 6.

3. A process for the production of a highly disperse potassium iron chromate pigment, which comprises subjecting an aqueous potassium chloride solution to electrolysis with an anode initially consisting essentially of iron chromium with at least about 50% of chromium, while permanently maintaining a pH value of the electrolyte of between about 2 and about 6 by adding caustic potash to the electrolyte as and when required.

4. A process for the production of a highly disperse potassium iron chromate pigment, which comprises subjecting an aqueous solution of a salt of the class consisting of potassium chloride and potassium chromate, to electrolysis with an anode initially consisting essentially of iron chromium with at least about 50% of chromium, while permanently maintaining a pH value of the electrolyte of between 2 and about 6, removing the potassium iron chromate sludge formed from the electrolyte and drying the same.

5. A process for the production of a highly disperse potassium iron chromate pigment, which comprises subjecting an aqueous potassium chromate solution to electrolysis with an anode initially consisting essentially of iron chromium with at least about 50% of chromium, while permanently maintaining a pH value of the electrolyte of between 2 and about 6, removing the potassium iron chromate sludge formed from the electrolyte, suspending said sludge in water and treating the suspension in a closed vessel at temperatures in excess of 100° C.

6. A process for the production of a highly disperse potassium iron chromate pigment, which comprises subjecting an aqueous potassium chloride solution to electrolysis with an anode initially consisting essentially of iron chromium with at least about 50% of chromium, while permanently maintaining a pH value of the electrolyte of between 2 and about 6, removing the potassium iron chromate sludge formed from the electrolyte, suspending said sludge in about twice the amount by weight of water and treating the suspension in a closed vessel at about 200° C.

WILHELM MÜLLER.
LEONHARD SPIES.